United States Patent Office 3,004,021
Patented Oct. 10, 1961

3,004,021
NOVEL AMPHOTERIC SURFACE-ACTIVE COMPOUNDS AND A PROCESS FOR THEIR MANUFACTURE
Hans-Dieter Selle and Angela Ruhnau, Berlin, Germany, assignors to VEB Chemische Fabrik Grünau, Berlin-Grunau, Germany
No Drawing. Filed Dec. 13, 1956, Ser. No. 628,005
10 Claims. (Cl. 260—123.7)

This invention relates to protein decomposition products and more particularly to novel amphoteric, surface-active peptide-comprising compounds and a process for their production.

It is known that surface-active protein derivatives may be obtained by hydrolytically splitting protein substances and reacting the peptide-like decomposition products thus obtained in the form of a concentrated aqueous solution with the halides of higher saturated or unsaturated aliphatic carboxylic or sulfonic acids in an alkaline medium. The protein substances referred to should preferably be of animal origin, such as for example horn, hair or meat-, skin-, leather waste or the like, while the hydrolytic splitting or decomposition is effected by heating the protein substances in an alkaline or acid medium. For the purpose of attaining optimum surface-active characteristics, the carboxylic or sulfonic acids employed should preferably comprise a carbon chain of 8 to 23 carbon atoms. These known protein derivatives referred to are generally illustrated by the following general formula:

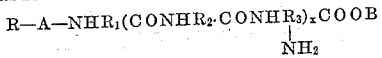

wherein:

R is a saturated or unsautrated alkyl- or alkylaryl hydrocarbon chain having from 8 to 23 carbon atoms,
A stands for CO or $SO_2$

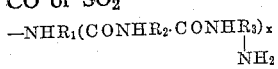

is the radical of a peptide of naturally occurring amino acids formed by hydrolysis of protein,
x stands for any integer between 1 and 5, and
B is an alkali metal, ammonium or an organic base.

As will be gathered from above fromula, $R_3$ is the residue of a diamino-carboxylic acid, while $R_1$ and $R_2$ are the residues of monoamino-monocarboxylic acids or monoaminodicarboxylic acids. However, $R_1$ and $R_2$ may also be the residues of sulfur-containing amino acids. The amino acids, the residues of which are contained in the peptide radical, take part in the constitution of the original protein.

Peptides which are obtained by hydrolytic splitting of protein are always mixed i.e. they contain residues of monoamino carboxylic acids and at least one residue of a diamino carboxylic acid. The reason that peptides obtained by the hydrolytic splitting from protein always contain at least one diamino carboxylic acid residue is found in the fact that diamino carboxylic acids, for example, lysine, i.e. $NH_2(CH_2)_4CH(NH_2)COOH$, form part of practically all proteins.

These known surface-active protein derivatives are available in the trade for example under the designations "Lamepon" (trademark) and "Maypon" (trademark).

In a book by John Wellan McCutcheon on "Synthetic Detergents," published by McNair-Dorland Co., N.Y., 1950, a full description for the preparation of Lampeon A and the corresponding types of compounds called "Maypon" in the U.S.A. is given on page 208.

Descriptions of surface-active protein derivatives such as those mentioned above are also contained in U.S. Patents No. 2,015,912 to Fritz Sommer, No. 2,041,265 to Ludwig Orthner and Georg Mayer, and No. 2,373,603 to John B. Rust.

The known surface active protein derivatives referred to possess anionic properties, i.e. the molecule moiety which possesses the surface-active properties, is in aqueous solution present in the form of anions. The fact that these known protein derivatives exhibit anionic-properties obviously restricts their scope of application. For example, for the purpose of improving or refining textiles such known protein derivatives cannot be employed if the presence of cationic substances is a fact or expected. Further, the wetting and washing effect of these known derivatives is reduced, if the pH-value is transferred into the acidic range. Apart therefrom, these known protein derivatives are not or only conditionally stable towards acids.

It is known to avoid the difficulties referred to by employing known non-ionogenic or amphoteric surface-active substances. However, these hitherto known substances are not of protein origin and do not comprise peptide groups. The presence and effect of peptide groups are, however, desired in many fields of application. As is known, the peptide group has a particular protective effect on textile fibers of animal and plant origin and on living skin and hair. Further, peptide-group comprising surface-active substances impart many advantageous characteristics to textiles, a fact which has been noted and taken advantage of in the improvement and refining of textile materials. Among other advantages, the peptide group imparts to textiles a better feel, a fact which is utilized in the dyeing of knitted goods.

From above remarks it will be evident that the production of surface-active protein derivatives with amphoteric properties is very desirable.

The demand for the production of such derivatives has already been complied with in a known process. According to this known process peptide-like decomposition products—which are obtained by partial splitting of protein—are reacted with the halides of halogenated carboxylic acids and the reaction products thus obtained are reacted with tertiary amines. The compounds thus obtained, if sufficiently devoid of by-products, possess amphoteric properties which are conditioned by the betaine-like structure of the compounds.

This known process has the following important drawback: For the purpose of obtaining compounds with optimum surface-active properties, halogenated fatty acids have preferably to be employed, wherein the halogen atom is in α-position, since otherwise the indispensable hydrophobic residue would be reduced. This, in turn, means on the one hand that such fatty acids have first to be produced—a fact which of course causes additional costs and expenditure in general—and on the other hand that the commonly available technical fatty acid mixtures, as they are obtained from fats of animal or plant origin, cannot be employed for the production of such fatty acids, since these mixtures nearly always have a considerable content of unsaturated fatty acids, for example oleic acid. These unsaturated fatty acids, i.e. for example oleic acid, would of course preferably form addition compounds, wherein the halogen atoms would be situated at about the middle of the carbon chain. Since these halogen atoms also react with tertiary amines upon quaternization, the hydrophobic fatty residue would in this case be considerably shortened, whereby consequently the surface-active properties of the final amphoteric compounds would be negatively affected.

It is an object of this invention to provide novel amphoteric, surface-active protein derivatives which are superior to known compounds of this kind, A further object of this invention is the provision of a process for the production of amphoteric, surface-active protein derivatives which is very simple to carry out without requiring substantial expenditure.

In accordance with the present invention, amphoteric surface-active protein derivatives may be obtained in an advantageous manner by condensing peptide-comprising protein decomposition products in the form of a concentrated, aqueous solution with the halides of higher saturated or unsaturated carboxylic- or sulfonic acids in an alkaline medium, and thereafter treating the condensates thus obtained with primary or secondary amines and at the same time or subsequently with formaldehyde.

The peptide-comprising protein decomposition products referred to may be obtained in known manner by hydrolytic splitting of protein of, preferably, animal origin in an acidic or alkaline medium.

The halides of saturated or unsaturated carboxylic- or sulfonic acids may, if desired, be composed of synthetic products or mixtures commonly available in the trade and obtained from fats of animal or plant origin.

By-products and starting materials which did not take part in the condensation referred to, are preferably removed from the condensates prior to subjecting the latter to the treatment with the amines and the formaldehyde. Such removal or separation of the by-products and unreacted starting material may be effected in any suitable manner known per se.

It is believed that the inventive reaction proceeds in such a manner that the amine employed is linked to reactive positions in the peptide group of the protein condensation product through a methylene bridge. It is furthermore believed that primarily the amino groups of diaminomonocarboxylic acid residues comprised in the peptide moiety of the condensates may be considered as such reactive places or positions in the peptide moiety. As previously pointed out, diamino carboxylic acid residues are always present in peptides obtained by hydrolytic splitting of protein.

Without committing ourselves, we believe that the inventive reaction as applied to condensation products of peptide and saturated or unsaturated carboxylic acids proceeds in a manner which may be expressed by the following general formula:

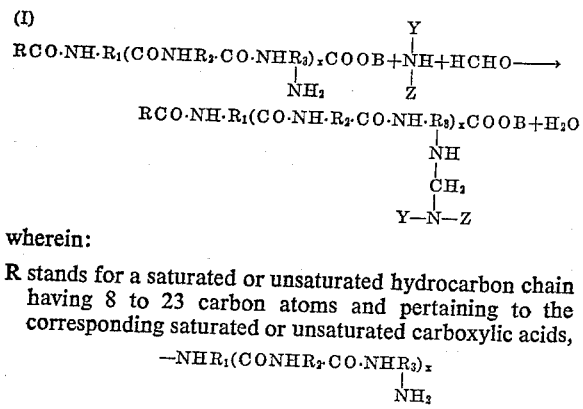

wherein:

R stands for a saturated or unsaturated hydrocarbon chain having 8 to 23 carbon atoms and pertaining to the corresponding saturated or unsaturated carboxylic acids,

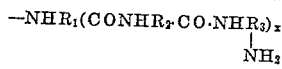

is the radical of a peptide of naturally occurring amino acids formed by hydrolysis of protein,
$R_1$ and $R_2$ are residues of monoamino acids,
$x$ stands for any integer between 1 and 5,

is a primary or secondary amine.
Y and Z stand for substituted or unsubstituted alkyl groups with not more than 4 carbon atoms, or for substituted or unsubstituted aryl groups, and one of the symbols Y and Z may stand for hydrogen, and
B is an alkali metal, ammonium or an organic base.

As will be readily gathered from above formula, $R_1$ and $R_2$ have been assumed to be the residues of monoamino acids, while $R_3$ has been assumed to be the residue of a diamino acid, said amino-acids forming part in the constitution of the protein.

The primary or secondary amines referred to may be employed as free bases or their solutions. However, they may also be used in the form of their salts, for example as hydrochloride, acetate and the like. The inventive reaction may also be carried out with aromatic amines, such as for example $C_6H_5NH_2$ in which case, however, the solubility of the final amphoteric product will sometimes be somewhat reduced. Also hydroxyamines, such as for example $H_2N \cdot C_2H_4 \cdot OH$ or $HN(C_2H_4 - OH)_2$ may be employed in the reaction. However, in the latter case undesired side reactions may sometimes occur, since the hydroxyl group of the amine is also reactive.

It has been observed that the inventive reaction proceeds best if a pH-value of about between 6 to 7.5 is maintained in the reaction mixture.

As previously pointed out, the inventive reaction may also be carried out with condensation products of peptide-comprising protein decomposition products and alkyl- or alkylarylsulfonic acids. It is commonly believed that such known condensates possess the following molecule structure:

(II) 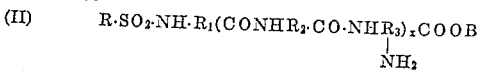

wherein R stands for a higher alkyl group having a carbon chain of about 8 to 23 carbon atoms or an alkylaryl group as for example $C_{14}H_{29} \cdot C_6H_4-$, and the remaining symbols have the meaning defined in connection with Formula I.

The optimum quantity of amine and formaldehyde with which the condensates are to be reacted depends of course on the nature and magnitude of the molecule of the peptide moiety in the respective condensate. As is the customary procedure under the given circumstances, the optimum amount is thus ascertained empirically.

Calculated on 100% of "Lamepon" (condensate) about 3–10% of methyl amine—or the equivalent amount of another amine—in the form of an aqueous solution or as salt are usually sufficient. The amount of formaldehyde is usually equivalent to the respective quantity of amine used plus an excess of formaldehyde of about 50%.

The amphoteric, surface-active protein derivatives according to this invention are obtained in the form of concentrated, viscous solutions which are readily soluble in water under strong foam formation. The derivatives are stable towards alkalis, acids and substances causing hardness of water, i.e. magnesium- and calcium salts. They possess excellent wetting-, dispersing-, emulsifying-, and cleaning properties which properties are almost independent of the relevant pH-value.

The invention will now be described by several examples. It should be understood, however, that these examples are given by way of illustration rather than by way of limitation and that many changes in, for example, quantities, choice of starting materials and process conditions in general may be effected without departing in any way from the spirit and scope of this invention as recited in the appended claims. In particular, it is pointed out that the alternative possibilities for carrying out the inventive process, which possibilities are mentioned in this specification but not illustrated by specific examples, must also be considered to be within the scope of the invention, since they constitute obvious chemical equivalents.

*Example 1*

The process to be described is carried out in a three-neck flask fitted with stirrer and reflux cooler. 100 grams of a concentrated aqueous solution of a pure condensation product of fatty acid and a peptide-comprising protein decomposition product are introduced into the flask. The aqueous solution of the condensation product has a dry content of condensation product of about 50–60%.

The pure condensation product of fatty acid and pepetide-comprising decomposition product used as starting material was obtained in the following manner: Animal skin or hide was hydrolytically split, whereby a peptide-comprising protein decomposition product was obtained. This decomposition product in the form of a concentrated solution was reacted with oleic acid chloride in an alkaline medium. The reaction product thus obtained was admixed with isopropyl alcohol. The amount of isopropyl alcohol employed was twice that of the reaction product. In this manner two distinct layers were obtained. The two layers were separated and the isopropyl alcohol contained in the upper, light yellow layer was removed by distillation. The residue of this upper layer after distillation comprises the desired pure condensate employed as starting material in the inventive process. The condensation product is thus a "Lamepon" as defined previously.

The concentrated aqueous solution of the pure condensate of fatty acid and the peptide-comprising protein decomposition product (Lamepon) is now admixed in the flask with 5 grams of methylamine hydrochloride. The admixture is carried out under stirring at a temperature of 50° C. When the methylamine hydrochloride has been dissolved, 10 grams of formaldehyde of 30% concentration are added to the reaction mixture while stirring. The temperature of the reaction mixture during the addition of the formaldehyde is maintained at the same value, i.e. 50° C. The reaction mixture is subsequently neutralized with a sodium hydroxide solution of 20% strength, whereafter the temperature is raised to 90–95° C. The reaction mixture is then stirred at the latter temperature for about one hour.

The reaction product thus obtained is a yellow-brown, very viscous liquid. It is readily soluble in water under ample foam formation and is stable towards acids, alkali and substances causing the hardness of water. Further, the reaction product has excellent wetting-, dispersing-, emulsifying- and cleaning properties which properties are independent of the respective pH-value.

*Example 2*

The process to be described is carried out in a three-neck flask fitted with stirrer and reflux cooler. 100 grams of a concentrated aqueous solution of a pure condensation product of fatty acid and a peptide-comprising protein decomposition product is introduced in the flask. The condensation product was obtained in the same manner as described in Example 1 and is thus identical therewith.

The concentrated condensate solution which has a dry content of about 50–60% is now mixed under stirring and a temperature of 20° C. with 5 grams of a solution containing 40% of methylamine. Subsequently and at the same temperature, 10 grams of formaldehyde of 30% concentration are added while stirring. The reaction mixture thus obtained is then neutralized with concentrated hydrochloric acid. The temperature is then raised to about 90–95° C. and the reaction mixture is stirred at this temperature for about one hour. The reaction product thus obtained has the same properties as that obtained according to Example 1.

*Example 3*

The process to be described is carried out in the apparatus described in Example 1. 100 grams of a concentrated solution of a pure condensation product of fatty acid and a peptide-comprising protein decomposition product are introduced into the flask.

The pure condensation product used as starting material was obtained in the following manner: Leather waste was partially split by hydrolysis, whereby a peptide-comprising protein decomposition product was obtained. This decomposition product in the form of a concentrated solution was reacted in an alkaline medium with the chloride of a coconut-oil fatty acid as it is commonly available in the trade. The reaction product thus obtained was dissolved in water and the solution thus obtained was admixed with 5% of benzoic acid calculated on the weight of the reaction product. Hydrochloric acid was then added to the solution under stirring until the solution reacted to the known Congo-red test. Subsequent to boiling the solution for a short time, the condensation product settled in the form of an oil-like free peptide-linked fatty acid. This oil-like product was separated and dissolved in a sodium hydroxide solution, whereby a concentrated solution of the pure condensation product of fatty acid and peptide-comprising protein decomposition product was obtained. This solution, which served as starting material for the inventive process, had a dry content of condensate of about 50–60%.

The 100 grams of the concentrated solution of the condensate are then mixed in the flask at 20° C. and under stirring with 5 grams of diethyl amine. Subsequently, 40 grams of formaldehyde of 30% concentration are run into the reaction solution, whereafter the solution is neutralized with concentrated hydrochloric acid. The temperature is then raised to about 90–95° C., whereafter the reaction mixture is stirred at this temperature for about one hour.

The reaction product obtained possesses distinct surface-active, amphoteric characteristics, similar to those of the product obtained in accordance with the procedure of Example 1.

*Example 4*

The process to be described is carried out in the apparatus described in Example 1.

The starting material used in the process was obtained in the following manner: A protein material was hydrolyzed, whereby a peptide-comprising decomposition product was obtained. This product was reacted with a higher paraffin sulfochloride—known in the trade in Germany under the designation "Mersol" (trademark). The product thus obtained is an impure condensate of sulfonic acid and the peptide-comprising protein decomposition product. This condensate was mixed with isopropyl alcohol. The amount of isopropyl alcohol employed was twice the amount of the condensate. Two distinct layers were obtained. Upon separation of the layers, a pure condensate of sulfonic acid and the peptide-comprising decomposition product was obtained by distillation from the upper, predominantly alcoholic layer. The condensate was obtained in the form of a concentrated, aqueous solution comprising about 50–60% of condensate. It is believed that this condensate falls within the scope of the Formula II given above.

100 grams of the aqueous concentrated solution of the pure condensate are introduced into the flask and admixed with 10 grams of methylamine hydrochloride. The admixture is performed at a temperature of 50° C. while stirring. When the methyl amine hydrochloride has been dissolved completely, 15 grams of formaldehyde of 30% concentration are run into the reaction solution at the same temperature. The solution is thereafter neutralized with sodium hydroxide solution of 20% concentration. The temperature is then raised to 90–95° C. and the reaction mixture is stirred at this temperature for about one hour.

A light yellow, viscous solution is obtained as reaction product. This solution exhibits amphoteric surface active properties.

What we claim is:

1. A process for the production of amphoteric surface-active peptide compounds comprising the steps of: reacting a compound which is obtained by the condensation of a sclero-protein hydrolysis product containing from 1 to 5 peptide groups with an acid chloride selected from the group consisting of aliphatic hydrocarbon carboxylic acid chlorides having a carbon chain of from 8 to 23 carbon atoms and aliphatic hydrocarbon sulfonic acid chlorides having from 8 to 23 carbon atoms, and from which substantially all by-products have been removed with (1) an amine of the general formula

wherein Y is selected from the group consisting of alkyl containing not more than 4 carbon atoms, hydroxy-substituted alkyl containing not more than 4 carbon atoms, and hydrogen, and Z is selected from the group consisting of alkyl containing not more than 4 carbon atoms and the phenyl radical when Y is hydrogen, and with (2) formaldehyde at an elevated temperature ranging from 80–100° C. then neutralizing the reaction mixture and finally continuing heating at said elevated temperature until the reaction is substantially complete.

2. The product produced by the process of claim 1.

3. A process for the preparation of amphoteric surface-active compounds which comprises condensing a polypeptide sclero protein hydrolysis product containing from 1 to 5 peptide groups with an acid chloride selected from the group consisting of aliphatic hydrocarbon carboxylic acid chlorides having a carbon chain of from 8 to 23 carbon atoms and aliphatic hydrocarbon sulfonic acid chlorides having from 8 to 23 carbon atoms, mixing the resulting condensation product with isopropyl alcohol, whereby an alcoholic layer containing the substantially pure condensation product is formed, removing the isopropyl alcohol from said layer and reacting the substantially pure condensation product so obtained with an amine of general formula

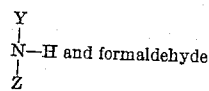

wherein Y is selected from the group consisting of alkyl containing not more than 4 carbon atoms, hydroxy substituted alkyl containing not more than 4 carbon atoms, and hydrogen, and Z is selected from the group consisting of alkyl containing not more than 4 carbon atoms, hydroxy substituted alkyl containing not more than 4 carbon atoms and the phenyl radical when Y is hydrogen at an elevated temperature ranging from 90–95° C., then neutralizing the reaction mixture and further heating at said elevated temperature until the reaction is substantially complete.

4. The process of claim 1 wherein the amine is methyl amine.

5. The process of claim 1 wherein the amine is methyl amine hydrochloride.

6. The process of claim 1 wherein the amine is diethyl amine.

7. The process of claim 1 wherein the amine is aniline.

8. The process of claim 1 wherein the amine is monoethanol amine.

9. The process of claim 1 wherein the amine is diethanol amine.

10. The process for the production of amphoteric surface-active peptide compounds comprising the steps of hydrolytically splitting a sclero protein so as to obtain a decomposition product containing from 1–5 peptide groups, condensing said decomposition product with a member selected from the group consisting of oleic acid chloride, cocoanut oil acid chloride and paraffin sulfonic acid chloride, removing the impurities from said condensation product, and reacting the condensate thus obtained in the form of an aqueous solution with (1) an amine of the general formula

wherein Y is selected from the group consisting of alkyl containing not more than 4 carbon atoms, hydroxy-substituted alkyl containing not more than 4 carbon atoms and hydrogen, and Z is selected from the group consisting of alkyl containing not more than 4 carbon atoms, hydroxy-substituted alkyl containing not more than 4 carbon atoms and the phenyl radical when Y is hydrogen, and with (2) formaldehyde at an elevated temperature ranging from 80–100° C., then neutralizing the reaction mixture and continuing heating at said elevated temperature until the reaction is substantially complete.

References Cited in the file of this patent

UNITED STATES PATENTS

| | | |
|---|---|---|
| 2,041,265 | Orthner et al. | May 19, 1936 |
| 2,580,880 | Bird et al. | Jan. 1, 1952 |

FOREIGN PATENTS

| | | |
|---|---|---|
| 736,584 | Great Britain | Sept. 14, 1955 |
| 914,855 | Germany | July 12, 1954 |

OTHER REFERENCES

Fraenkel-Conrat et al.: J.A.C.S., vol. 70 (1948), pp. 2673–84.